US012689248B2

(12) United States Patent (10) Patent No.: US 12,689,248 B2
Brion et al. (45) Date of Patent: Jul. 21, 2026

(54) SYNCHRONOUS ELECTRIC MOTOR, RANGE OF ELECTRIC MOTORS, DEVICE FOR CLOSING, SHADING OR PROTECTING AGAINST THE SUN, COMPRISING AN ELECTRIC MOTOR FROM SUCH A RANGE AND METHOD FOR PRODUCING SAME

(71) Applicant: SOMFY ACTIVITES SA, Cluses (FR)

(72) Inventors: Pierre Brion, Cluses (FR); Thierry Tollance, Cluses (FR); Ronan Georgeault, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 277 days.

(21) Appl. No.: 18/259,247

(22) PCT Filed: Dec. 22, 2021

(86) PCT No.: PCT/EP2021/087192
§ 371 (c)(1),
(2) Date: Jun. 23, 2023

(87) PCT Pub. No.: WO2022/136496
PCT Pub. Date: Jun. 30, 2022

(65) Prior Publication Data
US 2024/0322618 A1 Sep. 26, 2024

(30) Foreign Application Priority Data
Dec. 24, 2020 (FR) ...................................... 2014130

(51) Int. Cl.
*H02K 1/16* (2006.01)
*E06B 9/72* (2006.01)
(Continued)

(52) U.S. Cl.
CPC ............... *H02K 1/165* (2013.01); *E06B 9/72* (2013.01); *H02K 15/066* (2013.01); *H02K 1/16* (2013.01);
(Continued)

(58) Field of Classification Search
CPC .... H02K 15/064; H02K 15/065; H02K 3/522; H02K 1/146; H02K 2207/03;
(Continued)

(56) References Cited

U.S. PATENT DOCUMENTS 6,396,185 B1 * 5/2002 Asao ........................ H02K 1/16
310/179
6,894,414 B1 * 5/2005 Asao ........................ H02K 1/16
310/179
(Continued)

FOREIGN PATENT DOCUMENTS

CN 102332760 A * 1/2012 ............. H02K 1/165
EP 3261219 A1 12/2017
(Continued)

OTHER PUBLICATIONS

French Search Report for FR 2014130 dated Sep. 8, 2021, 2 pages.
(Continued)

*Primary Examiner* — Oluseye Iwarere
*Assistant Examiner* — Daniel K Schlak
(74) *Attorney, Agent, or Firm* — NIXON & VANDERHYE

(57) ABSTRACT
A synchronous electric motor includes a rotor and a stator. The stator includes an armature and coils. The armature includes a yoke and teeth. The teeth define recesses. The coils are mounted in the recesses of the armature. The stator is wound by insertion. Each coil is formed from a wire outside the stator, so that the coils are subsequently inserted into the recesses, through wire passages of the recesses
(Continued)

according to a direction radial to a central axis of the stator. Furthermore, a ratio of a surface area of each recess to a thickness of the yoke is between 5 mm and 10 mm, the surface area of each recess being measured in a plane perpendicular to the central axis of the stator.

20 Claims, 9 Drawing Sheets

(51) Int. Cl.

| | | |
|---|---|---|
| *H02K 3/52* | (2006.01) | |
| *H02K 15/064* | (2025.01) | |
| *H02K 15/066* | (2025.01) | |
| *H02K 17/16* | (2006.01) | |

(52) U.S. Cl.
CPC .......... *H02K 3/522* (2013.01); *H02K 15/064* (2013.01); *H02K 17/16* (2013.01); *H02K 2207/03* (2013.01); *H02K 2213/03* (2013.01)

(58) Field of Classification Search
CPC .... H02K 2213/03; H02K 15/066; E06B 9/72; E06B 2009/725
See application file for complete search history.

(56) References Cited

U.S. PATENT DOCUMENTS

| | | | | |
|---|---|---|---|---|
| 11,306,531 | B2 * | 4/2022 | Sonzini .................. | H02K 11/33 |
| 2007/0252447 | A1 | 11/2007 | Ionel et al. | |
| 2007/0273241 | A1 * | 11/2007 | Niguchi ................ | H02K 21/16 |
| | | | | 310/156.45 |
| 2009/0121576 | A1 | 5/2009 | Even et al. | |
| 2010/0181863 | A1 * | 7/2010 | Murakami ............. | H02K 3/522 |
| | | | | 310/215 |
| 2010/0295403 | A1 * | 11/2010 | Morita ................... | H02K 1/223 |
| | | | | 310/216.069 |

| | | | | |
|---|---|---|---|---|
| 2011/0085926 | A1 * | 4/2011 | Jung ...................... | H02K 17/20 |
| | | | | 310/208 |
| 2011/0198962 | A1 * | 8/2011 | Tang ........................ | H02K 3/28 |
| | | | | 310/216.069 |
| 2013/0038165 | A1 * | 2/2013 | Pan ........................ | H02K 1/146 |
| | | | | 310/156.48 |
| 2014/0035427 | A1 * | 2/2014 | Wolf ...................... | H02K 19/22 |
| | | | | 29/596 |
| 2016/0336838 | A1 * | 11/2016 | Kouda ................... | H02K 1/146 |
| 2017/0321480 | A1 * | 11/2017 | Li .............................. | E06B 9/68 |
| 2017/0366075 | A1 * | 12/2017 | Tong .................... | H02K 19/103 |
| 2018/0316234 | A1 * | 11/2018 | Ikawa .................... | H02K 29/03 |
| 2018/0358876 | A1 | 12/2018 | Fatemi et al. | |
| 2019/0103794 | A1 * | 4/2019 | Tollance ............... | H02K 21/16 |
| 2019/0214876 | A1 * | 7/2019 | Corcoran .............. | H02K 17/04 |
| 2020/0212732 | A1 * | 7/2020 | Otsuka ................. | H02K 1/2733 |
| 2020/0251968 | A1 * | 8/2020 | Hino ...................... | H02K 15/10 |
| 2020/0303988 | A1 * | 9/2020 | Meynet .................. | H02K 11/30 |
| 2021/0167653 | A1 * | 6/2021 | Bihari .................. | H02K 15/065 |
| 2022/0052566 | A1 * | 2/2022 | Chang .................... | H02K 1/278 |
| 2022/0200426 | A1 * | 6/2022 | Gohn ....................... | H02K 1/16 |
| 2024/0305155 | A1 * | 9/2024 | Tsukamoto ........... | H02K 3/345 |

FOREIGN PATENT DOCUMENTS

| | | | | | |
|---|---|---|---|---|---|
| FR | 2943863 | A1 * | 10/2010 | ............. | H02K 5/161 |
| KR | 20090053199 | A * | 5/2009 | ............. | F04B 35/04 |
| WO | 2017042487 | A1 | 3/2017 | | |
| WO | 2017174523 | A1 | 10/2017 | | |
| WO | 2019234030 | A1 | 12/2019 | | |

OTHER PUBLICATIONS

International Search Report for PCT/EP2021/087192 dated Apr. 26, 2022, 9 pages.
Written Opinion of the ISA for PCT/EP2021/087192 dated Apr. 26, 2022, 8 pages.

* cited by examiner

<u>FIG. 1</u>

SYNCHRONOUS ELECTRIC MOTOR, RANGE OF ELECTRIC MOTORS, DEVICE FOR CLOSING, SHADING OR PROTECTING AGAINST THE SUN, COMPRISING AN ELECTRIC MOTOR FROM SUCH A RANGE AND METHOD FOR PRODUCING SAME

CROSS-REFERENCE TO RELATED APPLICATIONS

This application is the U.S. national phase of International Application No. PCT/EP2021/087192 filed Dec. 22, 2021, which designated the U.S. and claims priority to FR Patent Application No. 2014130 filed Dec. 24, 2020, the entire contents of each of which are hereby incorporated by reference.

FIELD OF THE INVENTION

The present invention relates to an electric motor of the synchronous type, in particular for a closure, occultation or solar protection device, in other words an electric motor of the synchronous type of a closure, occultation or solar protection device, a range of electric motors comprising at least one such electric motor of the synchronous type and at least one electric motor of the asynchronous type, a closure, occultation or solar protection device comprising at least one electromechanical actuator equipped with at least one electric motor of the synchronous type or asynchronous type selected from this range of electric motors and a method for manufacturing an electric motor of the synchronous type or asynchronous type selected from this range of electric motors.

In general, the present invention relates to the field of occultation devices comprising a motorised drive device moving a screen, between at least one first position and at least one second position.

BACKGROUND OF THE INVENTION

Description of the Related Art

A motorised drive device comprises an electromechanical actuator of a movable closure, occultation or solar protection element such as a shutter, door, gate, blind or any other equivalent equipment, hereinafter referred to as a screen.

The electromechanical actuator comprises an electric motor.

Such an electric motor can be of the synchronous type, that is to say with a permanent magnet rotor and a stator with either a dental winding and an armature optimised for such a winding, or a distributed pitch winding.

Such an electric motor can also be of the asynchronous type, that is to say with a squirrel-cage rotor and a stator with an insert winding and an armature optimised for such a winding.

In a known way, these two types of electric motors thus comprise stators with, respectively, a different winding, according to a winding pattern adapted to the type of electric motor, and a different armature, adapted to the type of electric motor.

This diversity in the design of synchronous and asynchronous electric motors, in particular for an electromechanical actuator of a closure, occultation or solar protection device, has the disadvantage of being costly and increasing the complexity of industrialising electromechanical actuators, since each type of electric motor requires a different stator, especially a different armature and winding method, depending on whether it is a synchronous or asynchronous motor.

EP 3 261 219 A1 is known and describes a synchronous reluctance electric motor comprising a rotor and a stator. The stator comprises an armature and coils. The armature consists of a yoke and teeth. The teeth define recesses. Coils are mounted in the recesses of the armature. The coils are formed from square conductors. The stator is wound by axially inserting the square conductors into the recesses from one axial end of the stator. A ratio of a surface area of each recess to a thickness of the yoke is between 5 mm and 10 mm.

Also known is WO 2017/174523 A1 which describes an electronically switched brushless DC electric motor comprising a rotor and a stator. The stator comprises an armature and coils. The armature consists of a yoke and teeth. The teeth define recesses. Coils are mounted in the recesses of the armature.

SUMMARY OF THE INVENTION

The invention intends to remedy these disadvantages by proposing a synchronous electric motor whose stator armature is normally intended to be used to produce an asynchronous electric motor.

To this end, the present invention relates, according to a first aspect, to a synchronous electric motor,
the synchronous electric motor comprising at least:
　a rotor, and
　a stator,
　the stator comprising at least:
　　an armature, and
　　coils,
　the armature comprising at least:
　　a yoke, and
　　teeth, the teeth defining recesses, the coils being mounted in the recesses of the armature.

A ratio of a surface area of each recess to a thickness of the yoke is between 5 mm and 10 mm, the surface area of each recess being measured in a plane perpendicular to a central axis of the stator.

According to the invention, the stator is wound by insertion, each coil being formed from a wire outside the stator, so that the coils are subsequently inserted into the recesses, through wire passages, according to a direction radial to the central axis of the stator.

Thus, an insert winding of the stator of a synchronous electric motor, combined with an armature having a ratio of the surface area of each recess to the thickness of the yoke of between 5 and 10 mm allows, for a synchronous electric motor, the use of a stator armature which is wound by insertion and which is normally intended for use in an asynchronous electric motor.

In this way, it is possible to use the same stator armature to make both synchronous electric motors and asynchronous electric motors.

According to an advantageous feature of the invention, a ratio of a stator inner diameter to a coil volume outside the armature is between 1 mm/cm$^3$ and 5 mm/cm$^3$.

According to another advantageous feature of the invention, a height of the armature is between 20 mm and 120 mm.

According to another advantageous feature of the invention, a diameter of the wire forming each of the coils is between 0.13 mm and 1 mm.

According to another advantageous feature of the invention, a width of the wire passage of each recess is between 1.5 mm and 2.5 mm.

According to another advantageous feature of the invention, a minimum ratio of the width of the wire passage of each recess to the diameter of the wire forming each of the coils is 1.5.

According to another advantageous feature of the invention, the armature comprises a number of teeth equal to twelve and a number of recesses equal to twelve.

The present invention relates, according to a second aspect, to a range of electric motors, the range comprising at least:
    a synchronous electric motor, according to the invention and as mentioned above, and
    an asynchronous electric motor,
each synchronous or asynchronous electric motor comprising at least:
    a rotor, and
    a stator,
    the stator comprising at least:
    an armature, and
    coils,
    the armature comprising at least:
    a yoke, and
    teeth, the teeth defining recesses, the coils being mounted in the recesses of the armature.

For each of the synchronous and asynchronous electric motors, a ratio of a surface area of each recess to a thickness of the yoke is between 5 mm and 10 mm, the surface area of each recess being measured in a plane perpendicular to a central axis of the stator of the electric motor.

According to the invention,
    the stator armature of the synchronous electric motor and the stator armature of the asynchronous electric motor are identical, and
    the stator of the synchronous electric motor and the stator of the asynchronous electric motor are respectively wound by insertion, each coil being formed from a wire outside the stator, so as to insert the coils subsequently into the recesses, through wire passages of the recesses, according to a direction radial to the central axis of the stator.

This range of electric motors has similar features and advantages to those described above in relation to the synchronous electric motor according to the invention.

According to an advantageous feature of the invention, the winding pattern of each of the electric motors belonging to the range is adapted, on the one hand, according to whether the electric motor is synchronous or asynchronous and, on the other hand, according to a supply voltage of the electric motor.

According to another advantageous feature of the invention, a diameter of the wire forming each of the coils is between 0.13 mm and 1 mm.

According to another advantageous feature of the invention, a width of the wire passage of each recess is between 1.5 mm and 2.5 mm.

The present invention relates, according to a third aspect, to a closure, occultation or solar protection device, the closure, occultation or solar protection device comprising at least:
    a screen, and
    an electromechanical actuator, the screen being driven to move by the electromechanical actuator,
    the electromechanical actuator comprising at least one synchronous or asynchronous electric motor.

According to the invention, the synchronous or asynchronous electric motor is selected from the range of electric motors according to the invention and as mentioned above.

This closure, occultation or solar protection device has similar features and advantages to those described above in relation to the synchronous electric motor according to the invention and the range of electric motors according to the invention.

According to an advantageous feature of the invention, the closure, occultation or solar protection device further comprises a winding tube. The screen can be wound onto the winding tube. Furthermore, the winding tube is arranged to be rotated by the electromechanical actuator.

According to another advantageous feature of the invention, an inner diameter of the winding tube is between 40 mm and 100 mm.

The present invention relates, according to a fourth aspect, to a method for manufacturing a synchronous electric motor or an asynchronous electric motor, each synchronous or asynchronous electric motor comprising at least:
    a rotor, and
    a stator,
    the stator comprising at least:
    an armature, and
    coils,
    the armature comprising at least:
    a yoke, and
    teeth, the teeth defining recesses, the coils being mounted in the recesses of the armature.

According to the invention,
    the synchronous or asynchronous electric motor is selected from the range of electric motors according to the invention and as mentioned above,
    the armature is independent of the type of the electric motor,
    the winding of the stator is wound by insertion, each coil being formed from a wire outside the stator, so that the coils are subsequently inserted into the recesses, through wire passages of the recesses, according to a direction radial to a central axis of the stator, and
    the winding pattern is selected according to the type of electric motor.

This manufacturing method has similar features and advantages to those described above in relation to the synchronous electric motor according to the invention and the range of electric motors according to the invention.

BRIEF DESCRIPTION OF THE DRAWINGS

Further aspects and advantages of the invention will become apparent in the following description, given only as an example and referencing the attached drawings, in which.

DETAILED DESCRIPTION

Figure 1:
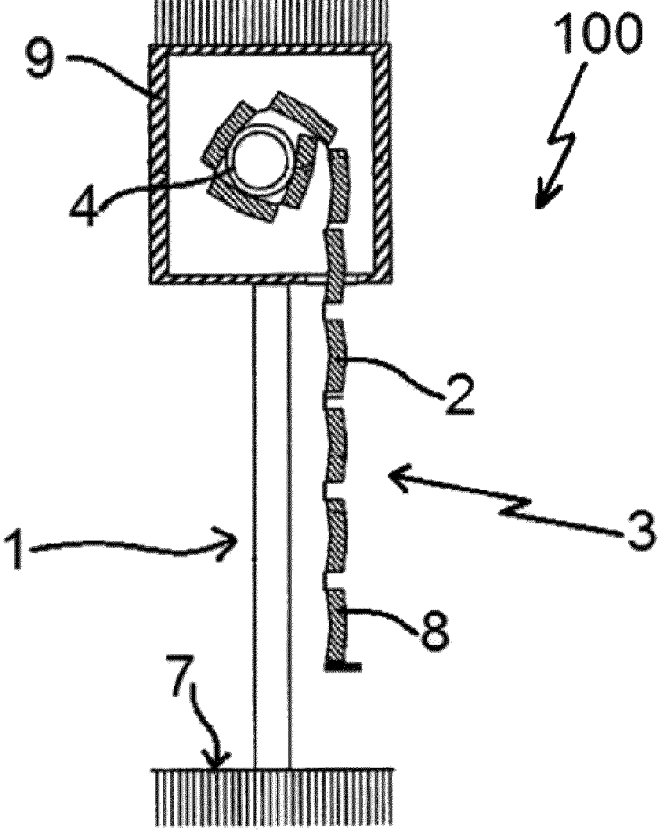
FIG. 1 is a schematic transverse cross-section view of an installation comprising a closure, occultation or solar protection device according to the invention.
Figure 2:
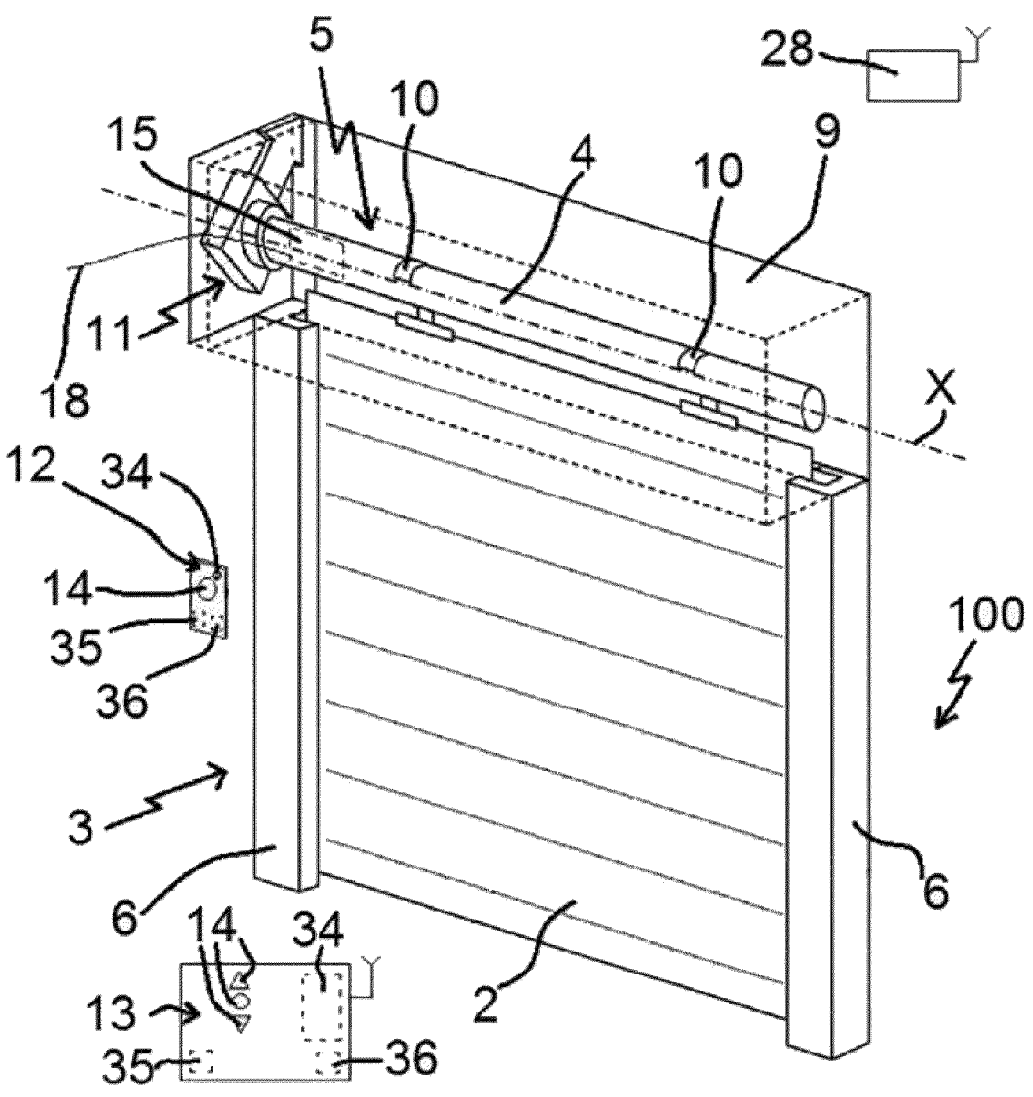
FIG. 2 is a schematic perspective view of the installation illustrated in FIG. 1.

Firstly, with reference to FIGS. 1 and 2, an installation 100 comprising a closure, occultation or solar protection device 3 installed in a building comprising an opening 1, which can be a window or door, is described. This installation 100 is equipped with a screen 2 belonging to the closure, occultation or solar protection device 3, in particular a motorised roller shutter.

The closure, occultation or solar protection device 3 is hereinafter referred to as the "occultation device". The occultation device 3 comprises the screen 2.

The occultation device 3 can be a roller shutter, a blind with a fabric or a blind with adjustable slats, a roller gate, a gate, a door or a swinging shutter. The present invention is applicable to all types of occultation device.

Here, the installation 100 comprises the occultation device 3.

Figure 3:
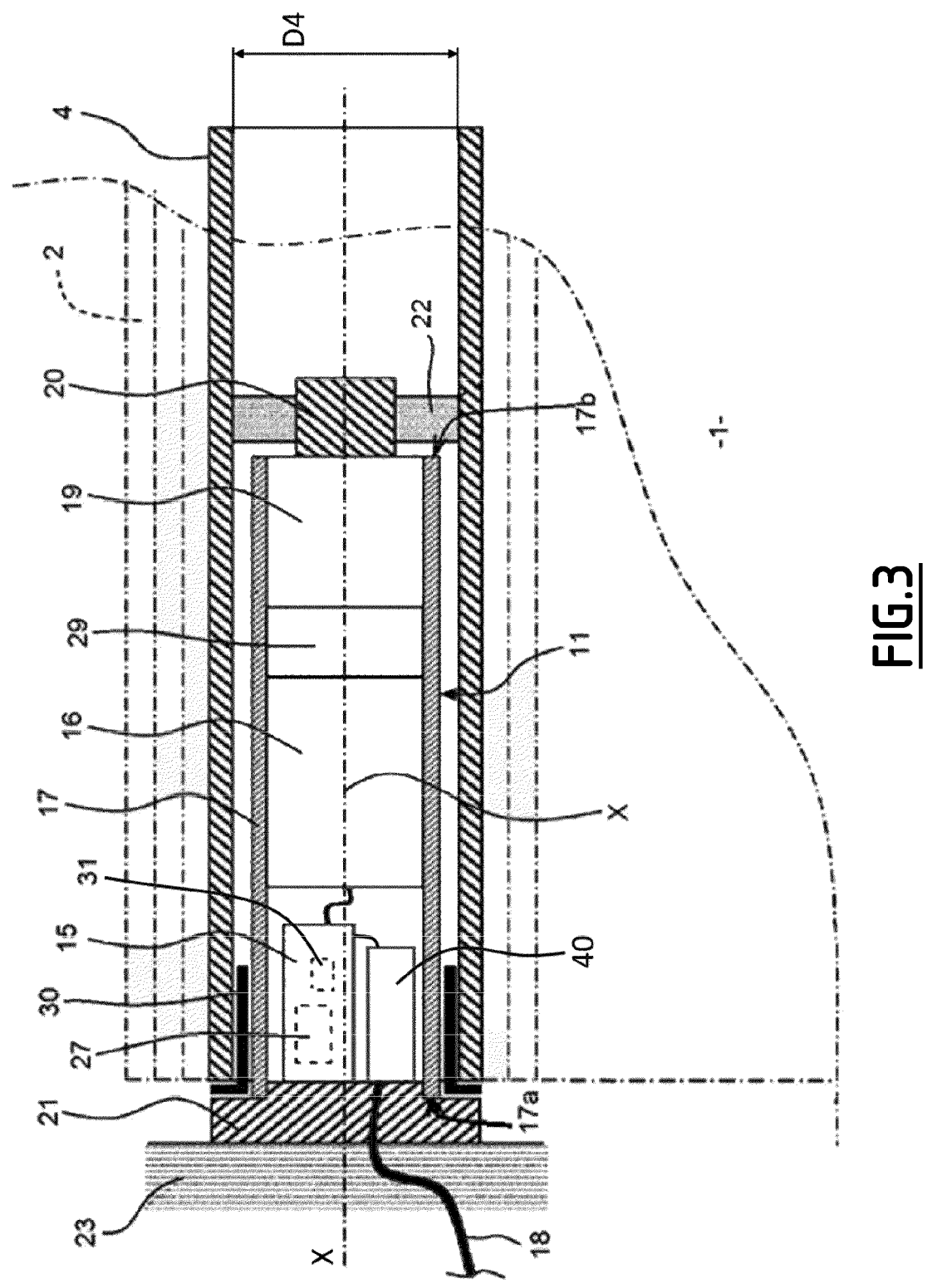
FIG. 3 is a schematic cross-section view of an electromechanical actuator, according to the first embodiment, of the installation illustrated in FIGS. 1 and 2, according to a sectional plane passing through an axis of rotation of an output shaft of the electromechanical actuator, this electromechanical actuator comprising at least one electric motor, according to the first embodiment of the invention.

With reference to FIGS. 1 to 3, a roller shutter according to the invention is described.

The occultation device 3 further comprises a motorised drive device 5. The motorised drive device 5 comprises an electromechanical actuator 11 more particularly illustrated in FIG. 3.

Advantageously, the occultation device 3 further comprises a winding tube 4. The screen 2 can be wound onto the winding tube 4. Furthermore, the winding tube 4 is arranged to be rotated by the electromechanical actuator 11.

The inner diameter of the winding tube 4 is denoted "D4".

Thus, the screen 2 of the occultation device 3 is wound onto the winding tube 4 or unwound around it, the winding tube 4 being driven by the motorised drive device 5, in particular by the electromechanical actuator 11.

In this way, the screen 2 is movable between a wound position, in particular a high position, and an unwound position, in particular a low position, and vice versa.

The screen 2 of the occultation device 3 is a closing, occultation and/or sun protection screen, which can be wound and unwound around the winding tube 4, the inner diameter of which is greater than the outer diameter of the electromechanical actuator 11, so that the electromechanical actuator 11 can be inserted into the winding tube 4, when the occultation device 3 is assembled.

The electromechanical actuator 11, in particular of tubular type, allows the winding tube 4 to be rotated about an axis of rotation X, so that the screen 2 of the occultation device 3 can be moved, in particular unwound or wound.

In the mounted state of the occultation device 3, the electromechanical actuator 11 is inserted into the winding tube 4.

In a known way, the roller shutter, which forms the occultation device 3, comprises a curtain comprising horizontal slats articulated to each other, forming the screen 2 of the roller shutter 3, and guided by two lateral slides 6. These slats are joined together when the curtain 2 of the roller shutter 3 reaches its unwound lower position.

In the case of a roller shutter, the wound upper position corresponds to a final end slat 8, for example in the shape of an L, of the curtain 2 of the roller shutter 3 coming to rest against an edge of the box 9 of the roller shutter 3 or to the end slat 8 being stopped in a programmed higher end-of-travel position. Furthermore, the unwound lower position corresponds to the final end slat 8 of the curtain 2 of the roller shutter 3 coming to rest against a threshold 7 of the opening 1 or to the final end slat 8 being stopped in a programmed lower end-of-travel position.

Here, the screen 2 is configured to be moved, by means of the motorised drive device 5, between an open position, corresponding to the wound position and which can also be called first end-of-travel position or high end-of-travel position FdcH, and a closed position, corresponding to the unwound position and which can also be called second end-of-travel position or low end-of-travel position FdcB.

Thus, the electromechanical actuator 11 is configured to drive, in other words drives, to move the screen 2, between the first end-of-travel position FdCH and the second end-of-travel position FdCB.

The first slat of the roller shutter 3, opposite the final end slat 8, is connected to the winding tube 4 by means of at least one joint 10, in particular a strip-shaped attachment piece.

The winding tube 4 is located inside the box 9 of the roller shutter 3. The curtain 2 of the roller shutter 3 rolls up and rolls down around the winding tube 4 and is housed at least partly inside the box 9.

In general, the box 9 is arranged above the opening 1, or at the upper part of the opening 1.

Advantageously, the motorised drive device 5 is controlled by a command unit. The command unit can be, for example, a local command unit 12 or a central command unit 13.

Advantageously, the local command unit 12 can be connected to the central command unit 13, via a wired or wireless connection.

Advantageously, the central command unit 13 can control the local command unit 12, and other similar local command units distributed throughout the building.

The motorised drive device 5 is, preferably, configured to execute the commands for unwinding or winding the screen 2 of the occultation device 3, which can be emitted, especially, by the local command unit 12 or the central command unit 13.

The installation 100 comprises either the local command unit 12, either the central command unit 13, or both the local command unit 12 and the central command unit 13.

The electromechanical actuator 11 belonging to the installation 100 of FIGS. 1 and 2 is now described, in more detail with reference to FIG. 3.

The electromechanical actuator 11 comprises an electric motor 16.

Means for controlling the electromechanical actuator 11, allowing the movement of the screen 2 of the occultation device 3, comprise at least one electronic control unit 15. This electronic control unit 15 is table to turn on the electric motor 16 of the electromechanical actuator 11 and, in particular, to enable the supply of electrical energy to the electric motor 16.

Thus, the electronic control unit 15 controls, especially, the electric motor 16, so as to open or close the screen 2, as described previously.

The means of controlling the electromechanical actuator 11 comprise hardware and/or software means.

As a non-limiting example, the hardware means can comprise at least one microcontroller 31.

Advantageously, the electronic control unit 15 further comprises a first communication module 27, in particular for receiving command orders, the command orders being emitted by a command orders emitter, such as the local command unit 12 or central command unit 13, these command orders being intended to control the motorised drive device 5.

Advantageously, the first communication module 27 of the electronic control unit 15 is wireless. In particular, the first communication module 27 is configured to receive radio command orders.

Advantageously, the first communication module 27 can also allow the reception of command orders transmitted by wired means.

Advantageously, the electronic control unit 15, the local command unit 12 and/or the central command unit 13 can be in communication with a weather station located inside the building or remote outside the building, including, especially, one or more sensors that can be configured to determine, for example, temperature, brightness, or wind speed, in the case where the weather station is placed outside the building.

Advantageously, the electronic control unit 15, the local command unit 12, and/or the central command unit 13 can also be in communication with a server 28, as illustrated in FIG. 2, so as to control the electromechanical actuator 11 according to data made available remotely via a communication network, in particular an Internet network that can be connected to the server 28.

The electronic control unit 15 can be controlled from the local command unit 12 and/or central command unit 13. The local command unit 12 and/or central command unit 13 is provided with a control keyboard. The control keyboard of the local or central command unit 12, 13 comprises one or more selection elements 14 and, eventually, one or more display elements 34.

By way of non-limiting examples, the selection elements can include push buttons and/or touch-sensitive keys. The display elements can comprise light emitting diodes and/or an LCD (Liquid Crystal Display) or TFT (Thin Film Transistor) display. The selection and display elements can also be realised by means of a touch screen.

The local and/or central command unit 12, 13 comprises at least one second communication module 36.

Thus, the second communication module 36 of the local command unit 12 or central command unit 13 is configured to emit, in other words emits, control command orders, in particular by wireless means, for example radio, or by wired means.

Furthermore, the second communication module 36 of the local command unit 12 or central command unit 13 can also be configured to receive, in other words receives, control command orders, in particular via the same means.

The second communication module 36 of the local command unit 12 or central command unit 13 is configured to communicate, in other words communicates, with the first communication module 27 of the electronic control unit 15.

Thus, the second communication module 36 of the local command unit 12 or central command unit 13 exchanges control command orders with the first communication module 27 of the electronic control unit 15, either monodirectionally or bidirectionally.

Advantageously, the local command unit 12 is a control point, which can be fixed or mobile. A fixed control point can be a control box to be fixed on a façade of the wall of the building or on a face of a frame of a window or door. A mobile control point can be a remote control, a smartphone or a tablet.

Advantageously, the local and/or central command unit 12, 13 further comprises a controller 35.

The motorised drive device 5, in particular the electronic control unit 15, is, preferably, configured to execute command orders for controlling the movement, in particular the closing and opening, of the screen 2 of the occultation device 3. These command orders can be emitted, especially, by the local command unit 12 or by the central command unit 13.

The motorised drive device 5 can be controlled by the user, for example by receiving a command order corresponding to pressing the or one of the selection elements 14 of the local command unit 12 or central command unit 13.

The motorised drive device 5 can also be controlled automatically, for example by receiving a command order corresponding to at least one signal from at least one sensor and/or a signal from a clock of the electronic control unit 15, in particular the microcontroller 31. The sensor and/or the clock can be integrated in the local command unit 12 or in the central command unit 13.

Advantageously, the electromechanical actuator 11 comprises a casing 17, in particular a tubular one. The electric motor 16 is mounted inside the casing 17, in particular in an assembled configuration of the electromechanical actuator 11.

Here, the casing 17 of the electromechanical actuator 11 is cylindrical in shape, in particular rotationally symmetrical about the axis of rotation X.

In an embodiment, the casing 17 is made of a metallic material.

The material of the casing of the electromechanical actuator is not limiting and can be different. In particular, it can be a plastic material.

Advantageously, the electromechanical actuator 11 further comprises an output shaft 20.

Advantageously, the electromechanical actuator 11 further comprises a gearbox 19.

Advantageously, the gearbox 19 comprises at least one reduction stage. The reduction stage can be an epicyclic gear train.

The type and number of reduction stages of the gearbox are not limiting.

Advantageously, the electromechanical actuator 11 further comprises a brake 29.

By way of non-limiting examples, the brake 29 can be a spring brake, a cam brake, a magnetic brake, or an electromagnetic brake.

The brake 29 is configured to brake and/or rotationally block the output shaft 20, so as to regulate the rotational speed of the winding tube 4, when the screen 2 is moved, and to keep the winding tube 4 blocked, when the electromechanical actuator 11 is electrically disabled.

Here and as seen in FIG. 3, in the assembled configuration of the electromechanical actuator 11, the brake 29 is configured to be arranged, in other words is arranged, between the electric motor 16 and the gearbox 19, in other words at the output of the electric motor 16.

In a variant, not shown, in the assembled configuration of the electromechanical actuator 11, the brake 29 is configured to be arranged, in other words is arranged, between the electronic control unit 15 and the electric motor 16, in other words at the input of the electric motor 16, between the gearbox 19 and the output shaft 20, in other words at the output of the gearbox 19, or between two reduction stages of the gearbox 19.

Advantageously, the gearbox 19, and eventually, the brake 29 are arranged within the casing 17 of the electromechanical actuator 11, in the assembled configuration of the electromechanical actuator 11.

The electronic control unit 15 of the electromechanical actuator 11 comprises an obstacle and limit detection device, not shown, during the winding of the screen 2 and during the unwinding of the screen 2.

The obstacle and limit detection device is activated during the winding and unwinding of the screen 2 by means of the microcontroller 31 of the electronic control unit 15 and, in particular, by means of an algorithm implemented by this microcontroller 31.

The winding tube 4 is rotated about the axis of rotation X and the casing 17 of the electromechanical actuator 11 and is supported by two pivot connections. The first pivot connection is made at a first end of the winding tube 4 by means of a ring 30 inserted around a first end 17a of the casing 17 of the electromechanical actuator 11. The ring 30 thus makes it possible to create a bearing. The second pivot connection, not shown in FIG. 3, is made at a second end of the winding tube 4, not visible in this figure.

Advantageously, the electromechanical actuator 11 further comprises a torque support 21, which can also be called "actuator head". The torque support 21 is arranged on the first end 17a of the casing 17 of the electromechanical actuator 11, in the assembled configuration of the electromechanical actuator 11.

The torque support 21 ensures that the forces exerted by the electromechanical actuator 11, in particular the torque exerted by the electromechanical actuator 11, are taken up by the building structure. The torque support 21 can advantageously also take up the forces exerted by the winding tube 4, especially the weight of the winding tube 4, the electromechanical actuator 11 and the screen 2, and ensure that these forces are taken up by the building structure.

Thus, the torque support 21 of the electromechanical actuator 11 allows the electromechanical actuator 11 to be fastened to a frame 23, in particular to a cheek of the box 9.

Advantageously, the torque support 21 protrudes from the first end 17a of the casing 17 of the electromechanical actuator 11, in particular the end 17a of the casing 17 receiving the ring 30. The ring 30 constitutes, in other words is configured to constitute, a bearing for the rotational guidance of the winding tube 4, in an assembled configuration of the occultation device 3.

Advantageously, the torque support 21 of the electromechanical actuator 11 can also allow the first end 17a of the casing 17 to be shuttered.

Moreover, the torque support 21 of the electromechanical actuator 11 can support at least part of the electronic control unit 15.

Advantageously, the electronic control unit 15 can be supplied with electrical energy by means of a power supply cable 18.

Here and as illustrated in FIG. 3, the electronic control unit 15 is thus arranged, in other words integrated, inside the casing 17 of the electromechanical actuator 11.

In a variant, not shown, the electronic control unit 15 is arranged outside the casing 17 of the electromechanical actuator 11 and, in particular, mounted on the box 9 or in the torque support 21.

Advantageously, the torque support 21 can comprise at least one button, not shown.

This button or these buttons can make it possible to adjust the electromechanical actuator 11 through one or more configuration modes, to pair with the electromechanical actuator 11 one or more command units 12, 13, to reset one or more parameters, which can be, for example, an end-of-travel position, to reset the paired command unit or units 12, 13, or to control the movement of the screen 2.

Advantageously, the torque support 21 can comprise at least one display device, not shown, so as to provide a visual indication of an operating parameter of the motorised drive device 5.

Advantageously, the display device comprises at least one light source, not shown, in particular a light-emitting diode.

This or these light sources are mounted on an electronic board of the electronic control unit 15 and, eventually, a transparent or translucent cover and/or a light guide, to allow the passage of the light emitted by the or each light source.

Advantageously, the output shaft 20 of the electromechanical actuator 11 is arranged inside the winding tube 4 and at least partly outside the casing 17 of the electromechanical actuator 11.

Here, one end of the output shaft 20 protrudes from the casing 17 of the electromechanical actuator 11, in particular from a second end 17b of the casing 17 opposite the first end 17a.

Advantageously, the output shaft 20 of the electromechanical actuator 11 is configured to rotate a connecting element 22. This connecting element 22 is connected to the winding tube 4, in the assembled configuration of the occultation device 3. The connecting element 22 is in the form of a wheel.

When the electromechanical actuator 11 is switched on, the electric motor 16 and the gearbox 19 rotate the output shaft 20. Furthermore, the output shaft 20 of the electromechanical actuator 11 rotates the winding tube 4 via the connecting element 22.

Thus, the winding tube 4 rotates the screen 2 of the occultation device 3, so that the opening 1 is opened or closed.

Advantageously, the electromechanical actuator 11 further comprises an electrical power supply cable 18, allowing it to be supplied with electrical energy, especially the electrical power supply to the electronic control unit 15 and the electrical power supply to the electric motor 16, in particular from a mains power supply network.

Here and as illustrated in FIG. 2, the electronic control unit 15 comprises a single electronic board. Furthermore, the electronic board is configured to control the electric motor 16 and, eventually, to access parameter and/or configuration functions of the electromechanical actuator 11, by means of selection and, eventually, display elements, not shown.

In a variant, not shown, the electronic control unit 15 comprises a first electronic board and a second electronic board. The first electronic board is configured to control, in other words controls, the electric motor 16. Furthermore, the second electronic board is configured to access parameter and/or configuration functions of the electromechanical actuator 11, by means of selection and, eventually, display elements, not shown. In the case where the electronic control unit 15 comprises a first electronic board and a second electronic board, the first electronic board of the electronic control unit 15 can be arranged inside the casing 17 of the electromechanical actuator 11. Furthermore, the second electronic board can be arranged within the torque support 21 of the electromechanical actuator 11. Moreover, the torque support 21 can comprise a cover, not shown. Furthermore, the second electronic board can be arranged within a housing formed between a portion of the torque support 21 and the cover.

The electric motor 16 comprises a rotor 50 and a stator 70 positioned coaxially around the axis of rotation X of the winding tube 4 in the mounted configuration of the motorised drive device 5.

Figure 4:
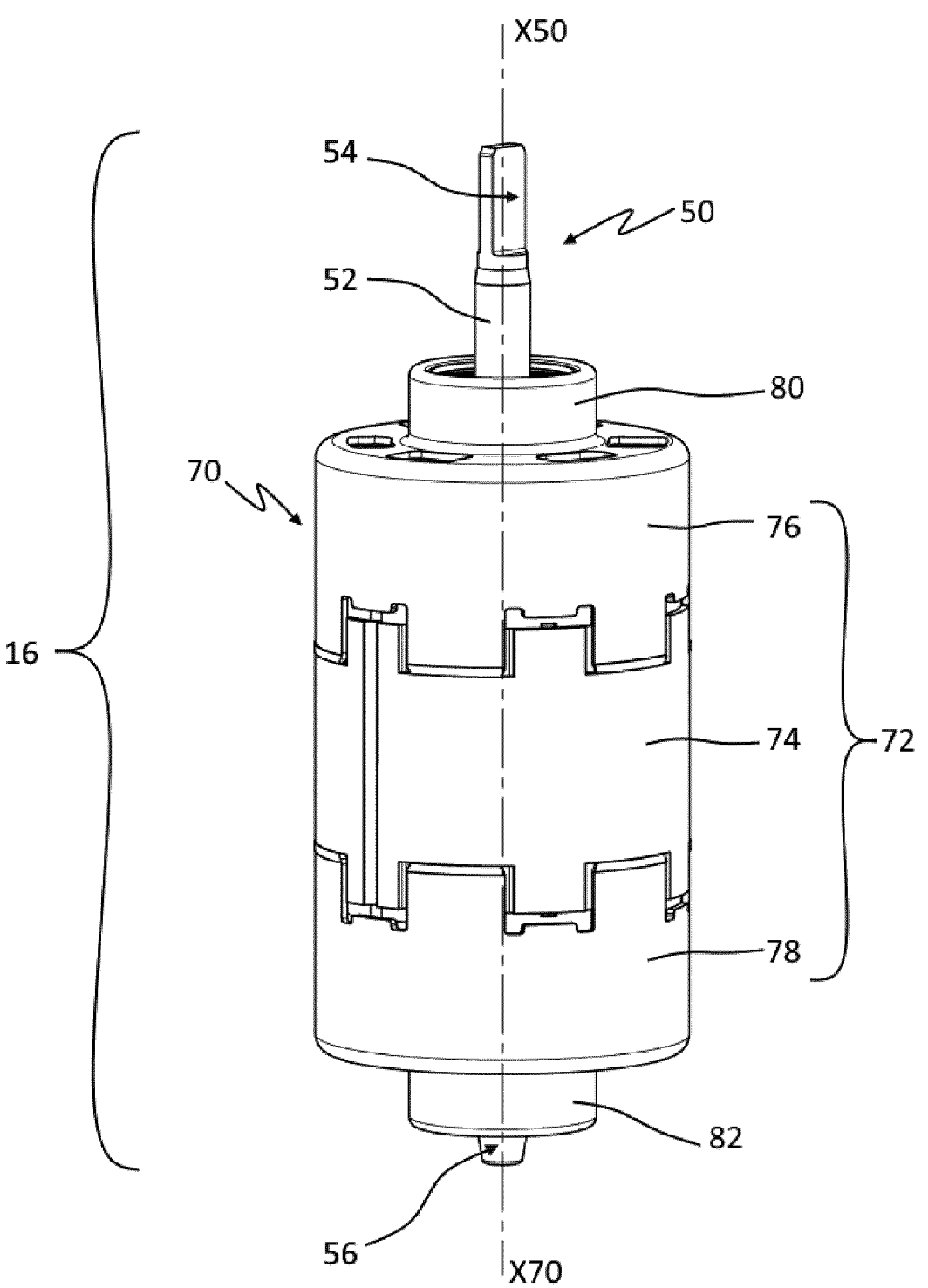
FIG. 4 is a schematic perspective view of the electric motor belonging to the electromechanical actuator illustrated in FIG. 3.
Figure 5:
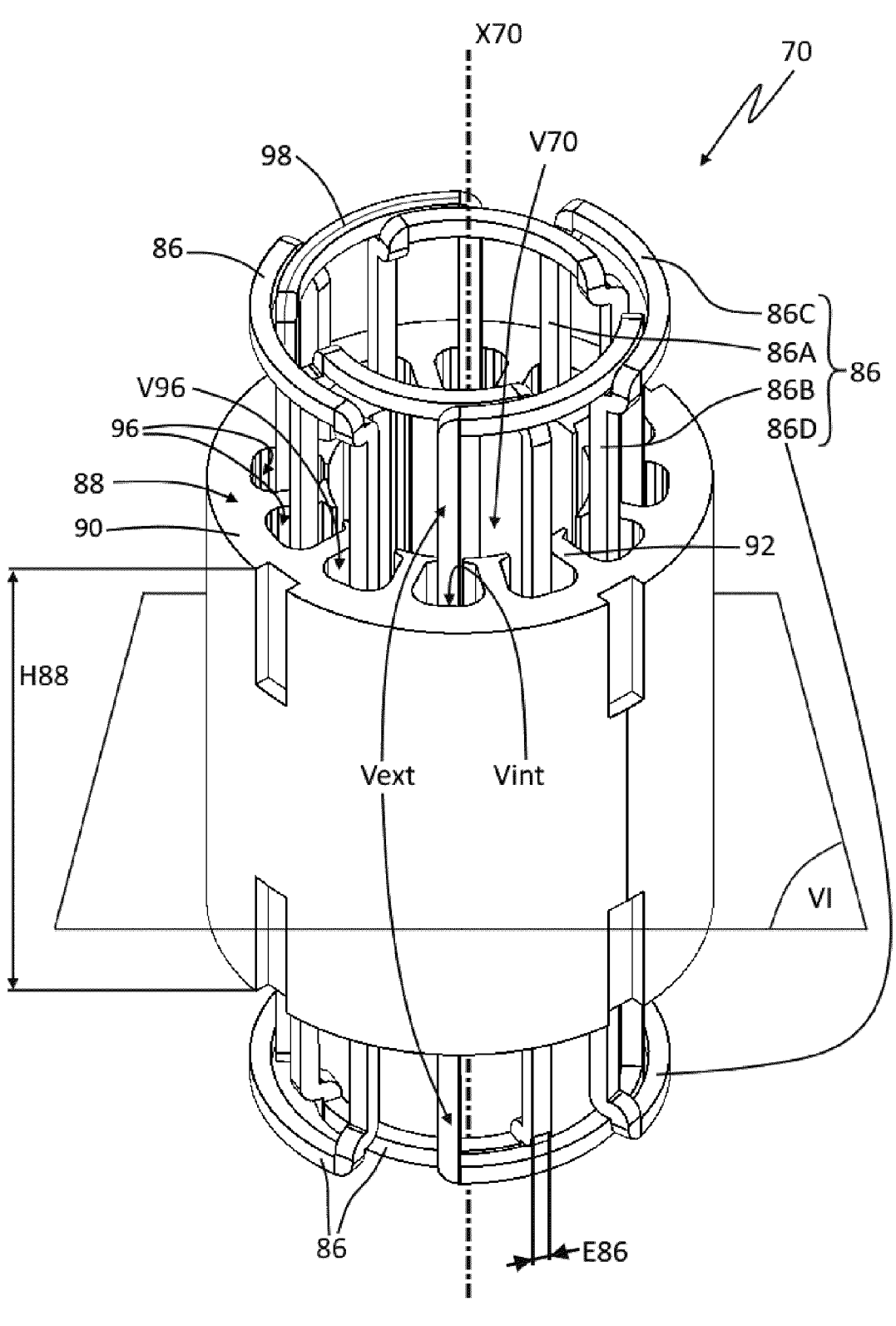
FIG. 5 is a schematic perspective view of a stator of the electric motor illustrated in FIG. 4.
Figure 6:
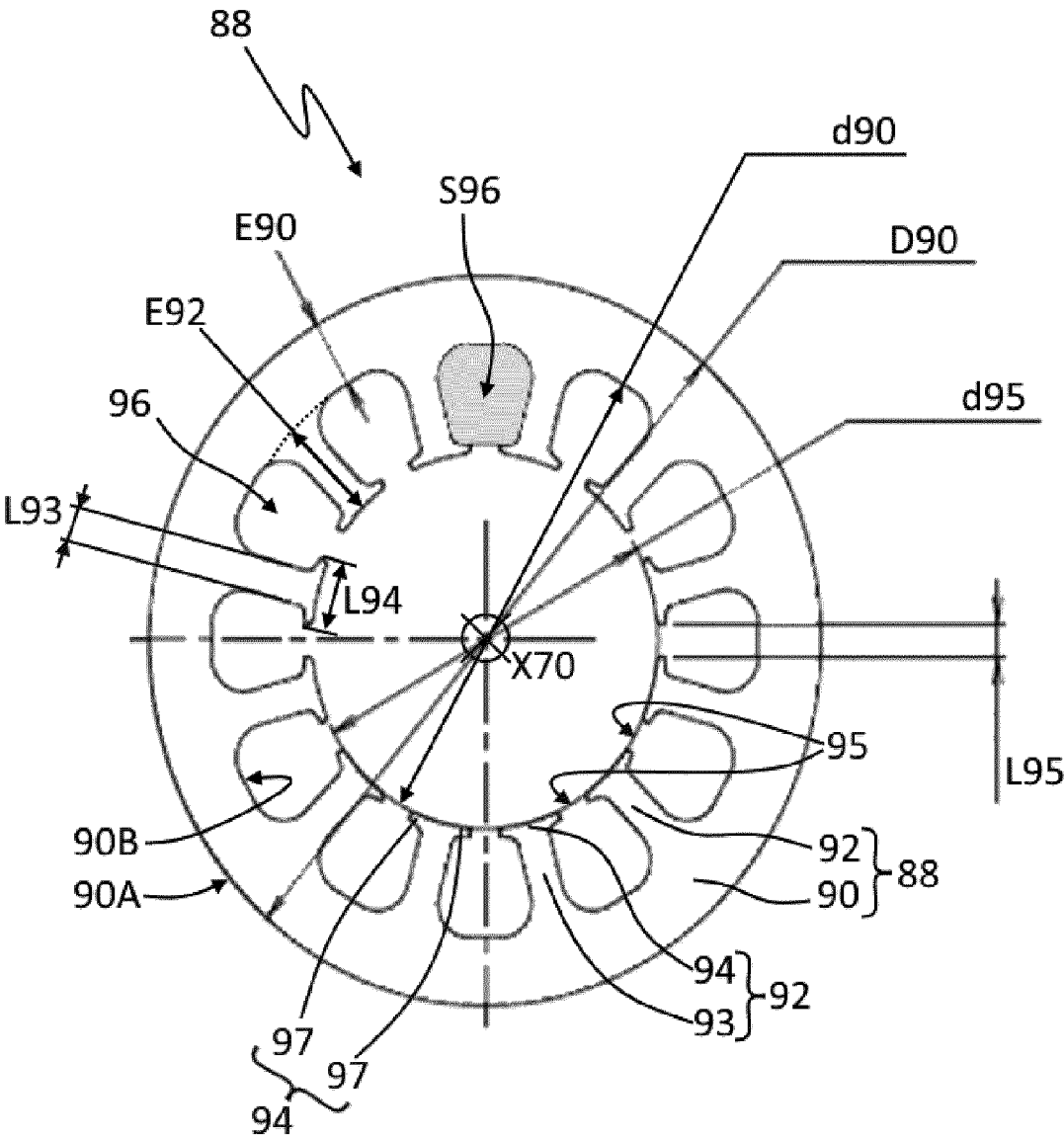
FIG. 6 is a schematic cross-section view, according to plane VI in FIG. 5, of an armature of the stator illustrated in FIG. 5.

A first embodiment of the electric motor 16 of the electromechanical actuator 11 illustrated in FIG. 3 is now described, in more detail with reference to FIGS. 4 to 6.

Here, the electric motor 16 is of the synchronous type, in particular with permanent magnets.

This synchronous electric motor 16 can also be called "BLDC" (BrushLess Direct Current).

Here, the synchronous electric motor 16 is supplied with electrical energy by the electronic control unit 15. The electronic control unit 15 is configured to supply, in other words supplies, the synchronous electric motor 16 with an alternating current from a mains power supply network, in particular by means of a power supply unit 40 arranged inside the casing 17, as illustrated in FIG. 3.

In practice, the power supply unit 40 is therefore connected, on the one hand, to the power supply cable 18 and, on the other hand, to the electronic control unit 15.

In a variant, not shown, the power supply unit 40 is integrated into the electronic control unit 15.

Advantageously, the power supply unit 40 comprises a first AC/DC converter, not shown, and a second DC/AC converter, not shown. The second DC/AC converter is configured to generate, in other words generates, a rotating electromagnetic field in the synchronous electric motor 16, by switching switching elements, in particular switches.

Here, the synchronous electric motor 16 is supplied with electrical energy from an AC voltage between 100 volts and 240 volts, these limit values being included. This AC voltage can have a frequency of either 50 Hertz or 60 Hertz.

In a known way, the rotor 50 is a permanent magnet rotor. Here, the rotor 50 comprises a number of pole pairs equal to four.

Advantageously, the rotor 50 comprises at least one rotor body, not shown, and a rotor shaft 52. A central axis of the rotor 50, which is coincident with the axis of rotation X, is denoted X50, in the mounted configuration of the electric motor 16 in the installation 100.

Here, the rotor shaft 52 can also be referred to as the "motor shaft".

Advantageously, the rotor shaft 52 protrudes on both sides of the rotor body.

Thus, the rotor shaft 52 comprises a first end 54 and a second end 56, which protrude from the rotor body.

The stator 70 has a central axis X70, which is coincident with the central axis X50 of the rotor 50, in particular in the assembled configuration of the electric motor 16.

Here, the stator 70 comprises a stator body 72, which is centred on the central axis X70.

Advantageously, the stator 70 defines an internal space V70, in particular cylindrical with a circular cross-section, illustrated in FIG. 5. The rotor 50 is configured to be positioned, in other words is positioned, within the internal space V70 of the stator 70, in particular in the assembled configuration of the electric motor 16. Furthermore, the rotor 50 is configured to be rotated, in other words is rotated, when the electric motor 16 is electrically activated.

Advantageously, the diameter of the cylindrical space V70 is such that it accommodates the rotor 50, in particular in the assembled configuration of the electric motor 16.

Here, since a magnetic or magnetised part of the rotor 50, in other words the rotor core, is located within the internal space V70 of the stator 70, the rotor 50 is referred to as internal rotor.

Advantageously, the stator body 72 comprises a central part 74 and two bowls 76, 78. Each bowl 76, 78 comprises a housing 80, 82. The housing 80, 82 of each of the bowls 76, 78 is configured to receive, in other words receives, a bearing, not shown, in particular in the assembled configuration of the electric motor 16. Each bearing is configured to rotatably support, in other words rotatably support, the rotor shaft 52, in particular in the assembled configuration of the electric motor 16.

Thus, the rotor 50 is mounted in the stator body 72 so as to be movable about the axis of rotation X and supported at the ends 54, 56 of the rotor shaft 52 via the two bearings.

Here, the first end 54 of the rotor shaft 52 is supported by a first bearing arranged in a first housing 80. Furthermore, the second end 56 of the rotor shaft 52 is supported by a second bearing arranged in a second housing 82.

Thus, the first and second bearings are positioned on either side of the stator body 72 along the axis of rotation X.

Here and as illustrated in FIG. 5, the stator 70 comprises an armature 88 and a plurality of coils 86. A cross-sectional view of the armature 88 is shown in FIG. 6.

Here and as shown in FIG. 5, the stator 70 comprises six coils 86.

The armature 88 consists of a yoke 90 and teeth 92.

Advantageously, the yoke 90 has the shape of a hollow cylinder, the axis of which is coincident with the central axis X70.

Advantageously, the yoke 90 comprises an outer face 90A, in particular cylindrical in shape, and an inner face 90B, in particular cylindrical in shape.

D90 is the outside diameter of the yoke 90 and d90 is the inside diameter of the yoke 90, measured in a plane perpendicular to the central axis X70, corresponding to the diameter of the outer face 90A and the diameter of the inner face 90B respectively.

E90 is the thickness of the yoke 90, measured in a plane perpendicular to the central axis X70 and along a radial axis of the yoke 90, in other words along an axis normal to the outer face 90A and inner face 90B.

The thickness E90 of the yoke 90 is calculated from the outer diameter D90 and the inner diameter d90 of the yoke 90, according to the following formula:

$$E90 = \frac{D90 - d90}{2}$$

The thickness E90 is therefore equal to the distance between the outer face 90A and the inner face 90B of the yoke 90.

Advantageously, the outer diameter D90 of the yoke 90 is between 30 mm and 65 mm and the inner diameter d90 of the yoke 90 is between 25 mm and 58 mm.

Advantageously, the thickness E90 of the yoke 90 is between 2 mm and 6 mm.

Here, the outer diameter D90 of the yoke 90 corresponds to the outer diameter of the stator 70.

Thus, the electric motor 16 is adapted to be positioned in the winding tube 4 with an inner diameter D4 between 40 mm and 100 mm.

The height of the armature 88 is denoted H88.

Advantageously, the height H88 of the armature 88 is between 20 mm and 120 mm.

Here, the teeth 92 of the armature 88 extend from the inner face 90B of the yoke 90 towards the central axis X70.

Here and as illustrated in FIG. 5, each tooth 92 extends over the full height H88 of the armature 88.

Here and as illustrated in FIGS. 5 and 6, the armature 88 comprises twelve teeth 92.

Advantageously, the teeth 92 have a "T" shape, that is to say that each of the teeth 92 comprises a central portion 93, which can also be referred to as "isthmus", which extends from the inner face 90B of the yoke 90 towards the central axis X70, and an end 94, in particular perpendicular to the central portion 93, which extends from a free end of the central portion 93 in a direction circumferential to the central axis X70, on either side of the free end of the central portion 93, so as to form two tooth roots 97.

The phrase "direction circumferential to the central axis X70", here and for the remainder of the description, means a direction contained in a plane perpendicular to the central axis X70 and tangential at any point on a circle contained in a plane perpendicular to the central axis X70 and whose centre is carried by the central axis X70. Such a circumferential direction is perpendicular to an axis radial to the central axis X70 and can be described as "orthoradial".

Thus, each tooth root 97 of an end 94 of a tooth 92 faces a tooth root 97 of the end 94 of the adjacent teeth 92, as illustrated in FIG. 6.

The width of the central portion 93 of a tooth 92, measured in the direction circumferential to the central axis X70, is denoted "L93".

The width of the end 94 of a tooth 92, measured in the direction circumferential to the central axis X70, is denoted "L94".

Here, the tooth roots 97 of the end 94 of two adjacent teeth 92 define an opening 95, which can also be called "wire passage", in other words they are not in contact.

The width of this wire passage 95, measured in the direction circumferential to the central axis X70, is denoted "L95".

Advantageously, the width L95 of each wire passage 95 is between 1.5 mm and 2.5 mm.

In practice, all the wire passages 95 of the armature 88 are arranged on an imaginary cylinder, the axis of which is coincident with the central axis X70 and the diameter of which, denoted "d95", is smaller than the inner diameter d90 of the yoke 90.

This diameter d95 can also be referred to as "stator inner diameter", as it delimits in practice the internal space V70 of the stator 70 in which the rotor 50 is housed.

Thus, the stator inner diameter d95 defines the dimensions of the rotor 50, and especially the maximum outer diameter of the rotor 50.

Advantageously, the stator inner diameter d95 is between 16 mm and 35 mm.

A tooth length 92, denoted "E92", is defined as the largest dimension of the teeth 92, measured in a plane perpendicular to the central axis X70 along an axis radial to the central axis X70.

The length E92 of each tooth 92 is calculated from the inner diameter d90 of the yoke 90 and from the stator inner diameter d95, according to the following formula:

$$E92 = \frac{d90 - d95}{2}$$

Here, two adjacent teeth 92 define an internal volume between them, which can also be referred to as "recess" and denoted "96". Furthermore, each recess 96 opens into the internal space V70 of the stator 70 through one of the wire passages 95.

Thus, each recess 96 is delimited by the inner face 90B of the yoke 90, by two adjacent teeth 92 and by the wire passage 95 extending between these two adjacent teeth 92.

Here, the teeth 92 and the wire passages 95 are all identical, so the recesses 96 are all identical.

"S96" is the surface area of a recess 96 measured in a plane perpendicular to the central axis X70. In FIG. 6, a recess 96 is shown shaded to represent the corresponding surface area S96.

Advantageously, the surface area S96 is between 15 mm² and 50 mm².

The volume of a recess 96 is denoted "V96". In practice, the volume V96 of a recess 96 is obtained by multiplying the surface area S96 of a recess 96 by the height H88 of the armature 88.

Advantageously, a coil 86 is formed by winding a wire 98. As illustrated in FIG. 5, each coil 86 is configured to be arranged, in other words is arranged, in the armature 88, more precisely in two recesses 96, in particular in the assembled configuration of the electric motor 16.

Here, the stator winding 70 comprises a plurality of wires 98, of which there can be three.

Advantageously, each wire 98 has a generally constant diameter.

Advantageously, the diameter of each wire 98 is advantageously between 0.13 mm and 1 mm.

Here, each coil 86 has an elongated "O" shape, in other words it has two main legs, denoted 86A and 86B, connected to each other by two ends, denoted 86C and 86D, in particular in the assembled configuration of the electric motor 16.

"E86" is the thickness of the main legs 86A, 86B, measured in the direction circumferential to the central axis X70, in particular in the assembled configuration of the electric motor 16.

Here and as illustrated in FIG. 5, the two main legs 86A, 86B of a same coil 86 are arranged in two non-adjacent recesses 96 and the ends 86C, 86D of the same coil 86 are arranged outside the armature 88.

Here and as illustrated in FIG. 5, the two ends 86C, 86D of a same coil 86 extend between the two main legs 86A, 86B of the same coil 86 in the direction circumferential to the central axis X70

Advantageously, each wire 98 of a coil 86 is wound a predetermined number of turns to form a coil 86, which can be, for example, between 10 and 1,000 times and, more particularly, between 50 and 600 times.

Thus, each main leg 86A, 86B and each end 86C, 86D comprises between 10 and 1,000 sections of wire 98.

Here, the stator 70 is wound by insertion. "Wound by insertion" means that each coil 86 is formed from a wire 98 outside the stator 70, in other words outside the stator 70, so as to be subsequently inserted into the recesses 96, through the wire passages 95 of the recesses 96, according to a direction radial to the central axis X70 of the stator 70.

To form the coils 86, the wire or wires 98 are wound in a precise winding pattern. This winding pattern is known per se and is adapted for the construction of the synchronous electric motor 16. FIG. 5 illustrates an example of an adapted winding pattern for the construction of the synchronous electric motor 16.

To aid visualisation of this winding pattern, the length of the main legs 86A, 86B of the coils 86, measured along an axis parallel to the central axis X70, has been enlarged in FIG. 5 in order to show the ends 86C, 86D remote from the armature 88. In practice, the ends 86C, 86D can be close to or in contact with the armature 88.

Furthermore, also to aid visualisation of this winding pattern, the depiction of each main leg 86A, 86B and each end 86C, 86D is simplified in FIG. 5.

Here, the two main legs 86A, 86B of a coil 86 are inserted into two non-adjacent wire passages 95, so that the coil 86 surrounds a plurality of teeth 92.

In the example shown in FIG. 5, which comprises six coils 86, one coil 86 surrounds three teeth 92. In other words, the main legs 86A, 86B of a coil 86 are inserted into two recesses 96 separated by two other recesses 96.

Advantageously, the two main legs 86A, 86B of a coil 86, being formed of a number of sections of wires 98 which can move relative to one another, these two main legs 86A, 86B can be deformed, that is to say that their cross-section, taken in a plane perpendicular to the central axis X70, can be modified, especially so as to reduce the thickness E86.

Thus, by deforming the main legs 86A, 86B of a coil 86 during their insertion into two recesses 96, the coil 86 can be mounted on the armature 88, in the case where the thickness E86 of each main leg 86A, 86B is greater than the width L95 of each wire passage 95.

A coil volume in the armature 88 is defined, in other words a coil volume within the armature 88, denoted "Vint". This volume Vint is the volume of a portion of all the coils 86 arranged inside the armature 88. This can correspond in practice to the volume of the main legs 86A, 86B of each coil 86.

A coil volume outside the armature 88 is defined, in other words a coil volume not within the armature 88, denoted "Vext". This volume Vext is the volume of a portion of all the coils 86 arranged outside the armature 88. This can correspond in practice to the volume of the ends 86C, 86D of each coil 86.

It is understood that the coil volume in the armature Vint is proportional to the surface area S96 of the recesses 96 and the height H88 of the armature 88. This coil volume in the armature Vint is furthermore dependent on the stator inner diameter d95 and the inner diameter d90 of the yoke 90, as these determine the surface area S96 of each recess 96.

It is also understood that the coil volume outside the armature Vext depends, especially, on the stator inner diameter d95 and on the distance separating the two main legs 86A, 86B of each coil 86, this distance depending on the width L93 of the central portion 93 of each tooth 92 and on the surface area S96 of each recess 96.

Advantageously, the coil volume outside the armature Vext is between 4.6 cm³ and 20.4 cm³.

Here, the sum of the coil volume within the armature Vint and the coil volume outside the armature Vext is equal to a total volume of the coils 86.

It is advantageous that, for a given outer diameter D90 of the yoke 90, that is to say for a given inner diameter D4 of the winding tube 4, and for a given stator inner diameter d95 of the stator 70, that is to say for a given rotor outer diameter 50, the coil volume inside the armature Vint is as large as possible, that is to say that the surface area S96 of each recess 96 is as large as possible.

Indeed, maximising the surface area S96 of each recess 96 and thus the coil volume in the armature Vint allows to maximise the electromagnetic field strength generated by the coils 86 driving the rotor 50 and thus maximise the efficiency of the electric motor 16.

The inner diameter d90 of the yoke 90, on which the surface area S96 of each recess 96 depends, also depends on the thickness E90 of the yoke 90.

Thus, in order to quantify the stator 70, it is relevant to calculate a first ratio Q1, in other words a first quotient, of the surface area S96 of a recess 96, expressed in mm2, to the thickness E90 of the yoke 90, expressed in millimetres (mm). This first ratio Q1 is expressed in millimetres. In other words, the first ratio Q1 is calculated using the following formula:

$$Q1 = \frac{S96}{E90}$$

By adapting the geometry of the stator 70, it is possible to obtain a first ratio Q1 of between 5 mm and 10 mm.

Such a range of values of the first ratio Q1 is advantageous, since it is representative of the electric motor 16 whose armature 88 is optimised to maximise the surface area S96 of each recess 96.

Preferably, the first ratio Q1 is between 5.5 mm and 8.5 mm.

Advantageously, it is also relevant that the coil volume outside the armature Vext is as small as possible.

Indeed, only the electromagnetic field generated by the coil volume in the armature Vint can rotate the rotor 50. The coil volume outside the armature Vext thus corresponds to a volume of material that is not useful for rotating the rotor 50. Minimising this coil volume outside the armature Vext then allows to reduce the production cost of the electric motor 16.

To quantify the coil volume outside the armature Vext, it is interesting to calculate a second ratio Q2, in other words a second quotient, of the stator inner diameter d95 of the stator 70, expressed in millimetres (mm), to the coil volume outside the armature Vext, expressed in cm3.

Indeed, this second ratio Q2 allows the coil volume outside the armature Vext to be estimated independently of the stator inner diameter d95 of the stator 70. This makes it possible, for a fixed stator inner diameter d95 of the stator 70, to quantify the coil volume that is not required to rotate the rotor 50. This second ratio Q2 is expressed in mm/cm³. In other words, the second ratio Q2 is calculated using the following formula:

$$Q2 = \frac{d95}{V_{ext}}$$

By adapting the geometry of the stator 70, it is possible to obtain a second ratio Q2 of between 1 mm/cm³ and 5 mm/cm³.

Such a range of values for the second ratio Q2 is advantageous, as it is representative of the electric motor 16 whose coil volume outside the armature Vext is optimised, in other words is minimised.

Preferably, the second ratio Q2 is between 1 mm/cm³ and 4.5 mm/cm³.

To quantify the stator 70, it is interesting to calculate a third ratio Q3, in other words a third quotient, of the width L95 of the wire passages 95 of the recesses 96, expressed in millimetres (mm), to the wire diameter 98, called "d98" and expressed in millimetres (mm). This third ratio Q3 is expressed without units. In other words, the third ratio Q3 is calculated using the following formula:

$$Q3 = \frac{L95}{d98}$$

Advantageously, whatever the geometry of the stator 70, the third ratio Q3 is always greater than or equal to 1.5 and, preferably, greater than or equal to 2.

Thus, whatever the geometry of the stator 70, the wire passages 95 of the recesses 96 are always wide enough to allow the passage of the wire 98 of the coils 86, and thus the winding of the stator 70 by insertion.

Figure 7:
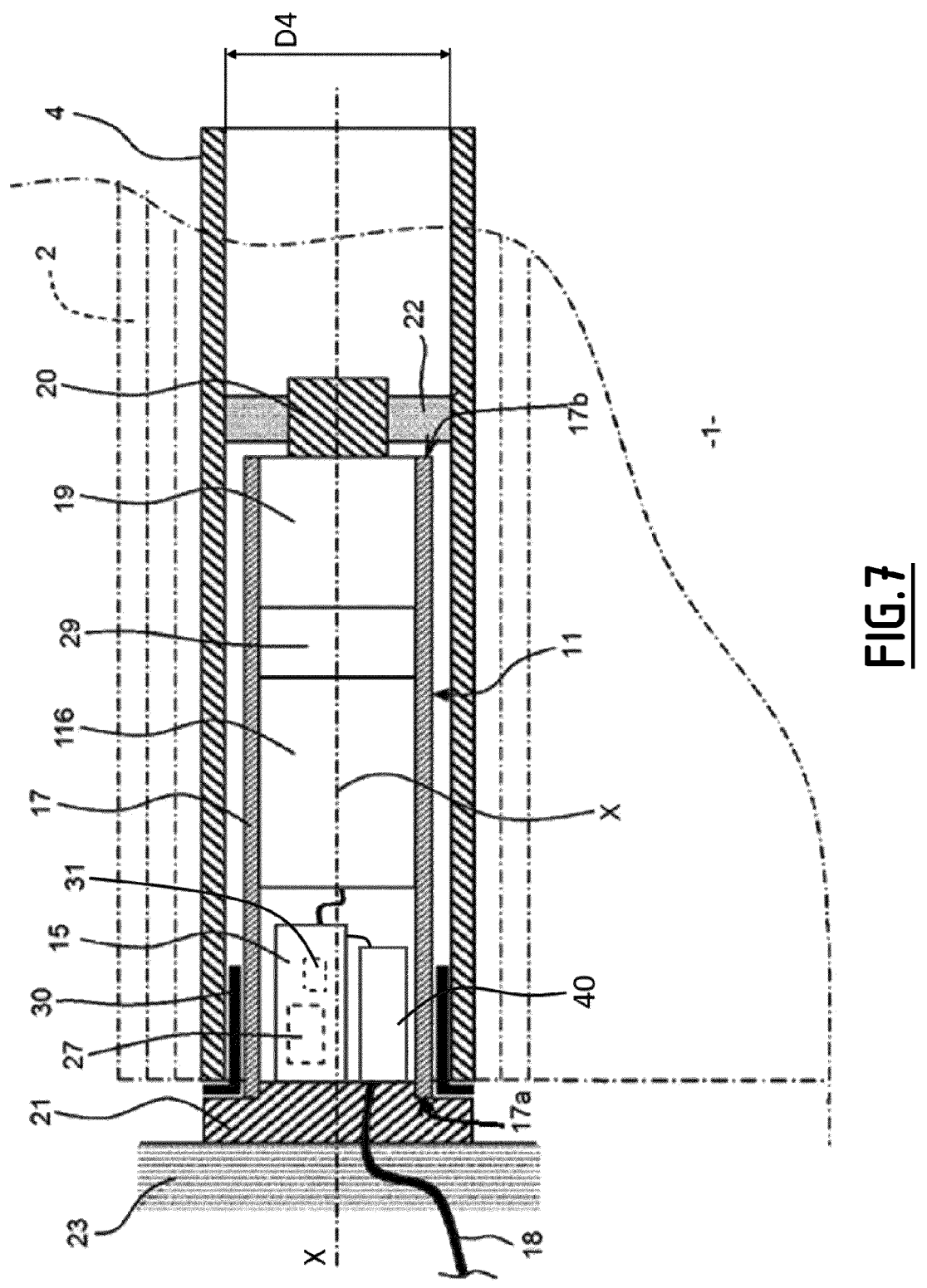
FIG. 7 is a schematic axial cross-section view, similar to FIG. 3, of an electromechanical actuator according to a second embodiment and belonging to an installation of the type illustrated in FIGS. 1 and 2.

An electromechanical actuator 11 comprising an electric motor 116 according to a second embodiment of the invention is now described, with reference to FIG. 7.

In this second embodiment, shown in FIG. 7, the elements similar to those of the first embodiment have the same references and operate as explained above. In the following, only the main differences between this second embodiment and the previous one are described. In the following, when a reference sign is used without being reproduced in FIG. 7, it corresponds to the object bearing the same reference in one of FIGS. 1 to 6.

Here, the electric motor 116 is of the synchronous type, in particular with permanent magnets.

This synchronous electric motor 116 can also be called "BLDC" (BrushLess Direct Current).

Here, the synchronous electric motor 116 is supplied with electrical energy by the electronic control unit 15. The electronic control unit 15 is configured to supply, in other words supplies, the synchronous electric motor 16 with an alternating current from an electric power supply source, such as, for example, a battery or an electric power supply network of the Ethernet type, which can also be called "PoE" (Power over Ethernet), in particular by means of a power supply unit 40 arranged inside the casing 17, as illustrated in FIG. 7.

In practice, the power supply unit 40 is therefore connected, on the one hand, to the power supply cable 18 and, on the other hand, to the electronic control unit 15.

In a variant, not shown, the power supply unit 40 is integrated to the electronic control unit 15.

Advantageously, the power supply unit 40 comprises a DC/AC converter, not shown. The DC/AC converter is configured to generate, in other words generates, a rotating electromagnetic field in the synchronous electric motor 16, by switching switching elements, in particular switches.

Here, the synchronous electric motor 116 is supplied with a DC voltage between 12 volts and 48 volts, these limit values being included.

Advantageously, when the synchronous electric motor 116 is supplied directly by a DC voltage, which can be, for example, between 12 volts and 48 volts, the diameter of the wires 98 is adapted.

In practice, the diameter of the wires 98 is increased compared to the diameter of the wires 98 of the synchronous electric motor 16 of the first embodiment described above, for example between 0.3 mm and 1 mm.

Thus, the increase in the diameter of the wires 98 reduces the ability of the coils 86 to be deformed, that is to say their ability to reduce the thickness E86 of the main legs 86A, 86B, especially when inserting the coils 86 into the recesses 96.

Here, the armature 88 of the stator 70 is therefore advantageously configured so that the width L95 of each wire passage 95 is adapted to allow insertion of the coils 86 when the diameter of the wires 98 is between 0.3 mm and 1 mm.

Here, the armature 88 of the electric motor 116 according to the second embodiment is identical to the armature 88 of the electric motor 16 according to the first embodiment.

Thus, the electric motor 116 according to the second embodiment also comprises six coils 86 mounted in twelve recesses 96. As a result, in particular, the quantities D90, d90, d95, E92, L94, L95, S96, Q1, Q2, Q3 are the same as in the first embodiment.

In this second embodiment, the winding pattern of the stator 70 is adapted to the DC supply voltage of the synchronous electric motor 116.

The winding pattern of the synchronous electric motor 116 according to the second embodiment is known per se and is adapted for the construction of such a synchronous electric motor.

Here, the synchronous electric motor 116 is also wound by insertion.

Figure 8:
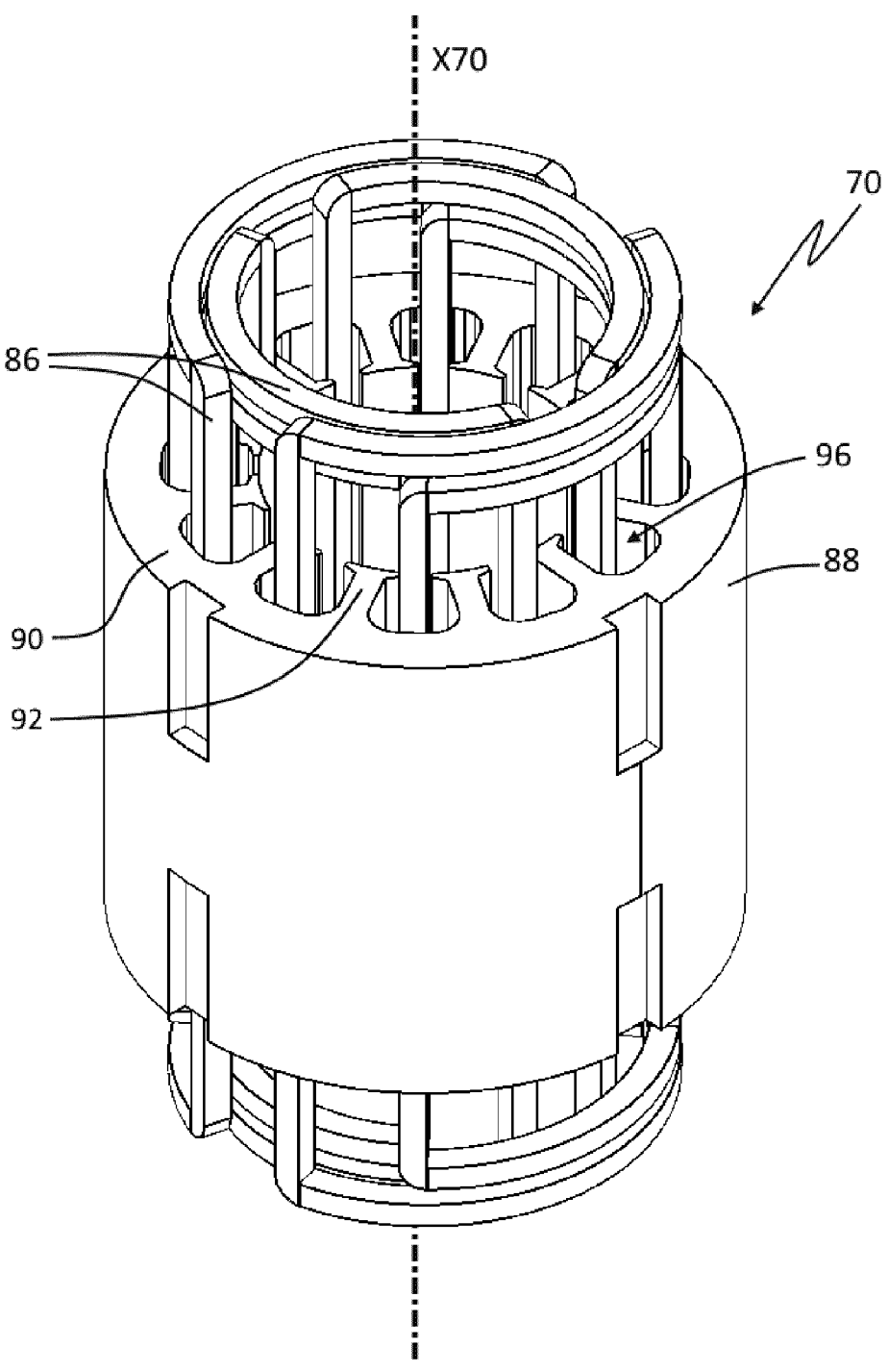
FIG. 8 is a schematic perspective view, similar to FIG. 5, of a stator of an asynchronous electric motor belonging to another electromechanical actuator equivalent to that illustrated in FIG. 3.
Figure 9:
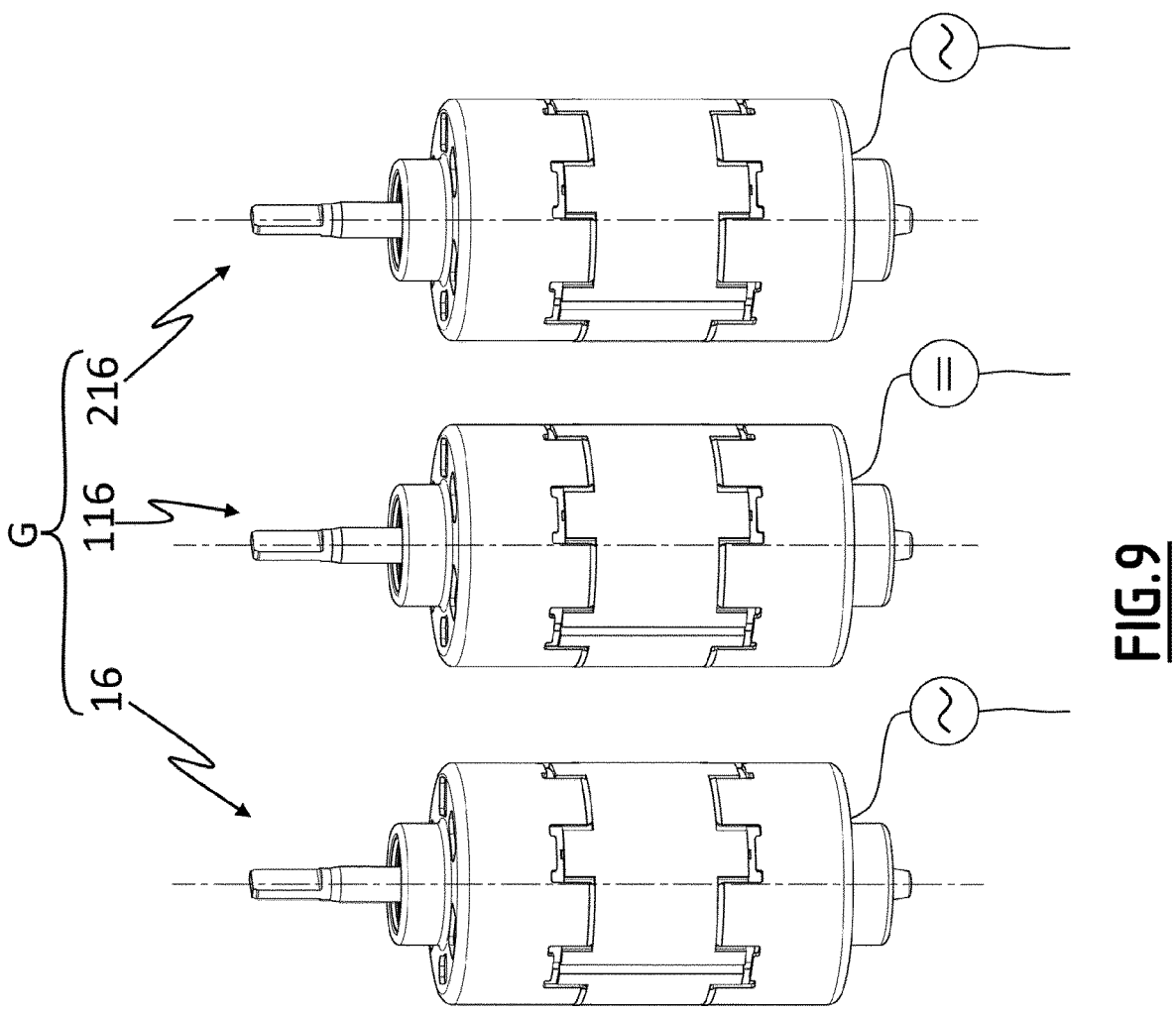
FIG. 9 is a perspective view of a range of electric motors according to the invention.

An electromechanical actuator 11 comprising an electric motor 216 according to a third embodiment is now described, with reference to FIGS. 8 and 9.

In this third embodiment of the invention, the elements similar to those of the first and second embodiments have the same references and operate as explained above. In the following, only the main differences between this third embodiment and the previous ones are described. In the following, when a reference sign is used without being reproduced in FIGS. 8 and 9, it corresponds to the object bearing the same reference in one of FIGS. 1 to 7.

Here, the electric motor 216, whose stator 70 is visible in FIG. 8, is of the asynchronous type.

Here, the asynchronous electric motor 216 is supplied with electrical energy by the electronic control unit 15. The electronic control unit 15 is configured to supply, in other words supplies, the asynchronous electric motor 216 with an alternating current from a mains power supply network, in particular by means of the power supply unit 40 being arranged inside the casing 17 and being connected, on the one hand, to the power supply cable 18 and, on the other hand, to the electronic control unit 15.

Here, the asynchronous electric motor 216 is supplied with an AC voltage between 100 volts and 240 volts, these limit values being included.

Thus, in this third embodiment, the asynchronous electric motor 216 is supplied directly with alternating current.

In a known manner, the rotor 50 of the asynchronous electric motor 216 is a squirrel cage rotor.

Here, the armature 88 of the electric motor 216 according to the third embodiment is identical to the armature 88 of the electric motor 16 according to the first embodiment or the electric motor 116 according to the second embodiment.

Thus, the electric motor 216 according to the third embodiment also comprises six coils 86 mounted in twelve recesses 96. As a result, in particular, the quantities D90, d90, d95, E92, L94, L95, S96, Q1, Q2, Q3 are the same as in the first and second embodiments.

In this third embodiment, the winding pattern of the asynchronous electric motor 216 is modified from the winding pattern of the synchronous electric motor 16, 116 according to the first or second embodiment, so as to rotate a squirrel cage rotor 50 relative to the stator 70.

The winding pattern of the asynchronous electric motor 216 according to the third embodiment is known per se and is adapted for the construction of such an asynchronous electric motor.

This winding pattern is illustrated in FIG. 8, where it can be seen that the coils 86 are inserted into certain recesses 96 of the armature 88 of the stator 70.

Here, the synchronous electric motor 216 is also wound by insertion.

Due to the geometry of the stator 70, it is possible to wind the asynchronous electric motor 216 according to an adapted winding pattern for the construction of such an asynchronous electric motor without having to modify the armature 88.

Thus, thanks to the invention, a same armature 88 of the stator 70 can be used to produce a synchronous electric motor supplied with alternating current, such as the synchronous electric motor 16 according to the first embodiment, or with direct current, such as the synchronous electric motor 116 according to the second embodiment, or to produce an asynchronous electric motor supplied with alternating current, such as the asynchronous electric motor 216 according to the third embodiment, by adapting the winding pattern of the stator 70 of the electric motor 16, 116, 216.

In this way, this armature 88 adapted to the construction of synchronous electric motors and asynchronous electric motors is advantageous, because it makes it possible to simplify the manufacture of such electric motors 16, 116, 216 by reducing the number of parts used.

Thanks to the range of values of the first ratio Q1 between 5 mm and 10 mm, it is possible to obtain the surprising and particularly interesting effect from an industrial point of view that the armature 88 can be used for the construction of both synchronous and asynchronous electric motors.

Furthermore, thanks to the range of values of the second ratio Q2 between 1 mm/cm³ and 5 mm/cm³ is also advantageous in order to allow the armature 88 to be used for the construction of synchronous electric motors and asynchronous electric motors.

A range G of electric motors is now described, in more detail and with reference to FIG. 9. This range G of electric motors comprises at least the synchronous electric motor 16 according to the first embodiment, supplied with alternating current, and/or the synchronous electric motor 116 according to the second embodiment, supplied with direct current, and the asynchronous electric motor 216 according to the third embodiment, supplied with alternating current.

Thus, this range G of electric motors comprises electric motors 16, 116, 216 which all have an identical armature 88 of the stator 70 and are all wound by insertion.

In this way, for each electric motor 16, 116, 216 in the range G, the first ratio Q1 of the surface area S96 of each recess 96 to the thickness E90 of the yoke 90 is between 5 mm and 10 mm.

Advantageously, for each electric motor 16, 116, 216 in the range G, the second ratio Q2 of the stator inner diameter d95 of the stator 70 to the coil volume outside the armature Vext is between 1 mm/cm³ and 5 mm/cm³.

Thanks to the invention, all the electric motors 16, 116, 216 in the range G have the same armature 88 of the stator 70 and their winding pattern is adapted according to whether the electric motor 16, 116, 216 is of the synchronous type or the asynchronous type and according to the supply voltage thereof, in particular its nature, which can be AC or DC, and/or its value.

Furthermore, the diameter of the wires 98 forming the coils 86 is adapted according to whether the electric motor 16, 116, 216 is of the synchronous type or the asynchronous type and according to the supply voltage thereof, in particular its nature, which may be AC or DC, and/or its value.

Therefore, with the range G of electric motors 16, 116, 216, it is possible to easily select a suitable electric motor for the closure, occultation or solar protection device 3.

A method for manufacturing a stator 70 for the synchronous electric motor 16, 116, according to the first or second embodiment, or for the asynchronous electric motor 216, according to the third embodiment, is now described.

According to this manufacturing method, the armature 88 chosen to manufacture the synchronous electric motor 16, 116, according to the first or second embodiment, or the asynchronous electric motor 216, according to the third embodiment, is independent of the type of electric motor being manufactured.

Here, the stator 70 of the electric motor 16, 116, 216 is always wound by insertion, regardless of the type of electric motor 16, 116, 216, which can be synchronous or asynchronous.

Advantageously, the winding pattern of the stator 70 is selected according to whether the electric motor 16, 116, 216 is of the synchronous type or the asynchronous type and according to the supply voltage thereof, in particular its nature, which can be AC or DC, and/or its value.

The contemplated embodiments and variants can be combined to form new embodiments of the invention, without departing from the scope of the invention defined by the claims.

In a variant, not shown, the armature 88 of the stator 70 comprises a number of distinct teeth 92, which can be, for example, sixteen or eighteen and, therefore, a number of recesses equivalent to the number of teeth 92, which can be, therefore sixteen or eighteen.

In a variant, not shown, the rotor 50 comprises a number of distinct pole pairs, which can be, for example, eight.

In a variant, not shown, the power supply unit 40 is not part of the casing 17.

The invention claimed is:

1. A synchronous electric motor comprising:
   a rotor; and
   a stator comprising
      an armature comprising:
         a yoke, and
         teeth defining recesses, and
         coils mounted in the recesses of the armature,
      wherein a ratio of a surface area of each recess to a thickness of the yoke is between 5 mm and 10 mm, the surface area of each recess being measured in a plane perpendicular to a central axis of the stator,
      wherein the stator is wound by insertion, each coil being formed from a wire outside the stator, so that the coils are subsequently inserted into the recesses, through wire passages of the recesses, according to a direction radial to the central axis of the stator,
      wherein a height of the armature is between 20 mm and 120 mm,
      wherein an outer diameter of the yoke is comprised between 30 mm and 65 mm, and
      wherein the synchronous electric motor is configured to operate with a closure, occultation or solar protection device.

2. The synchronous electric motor according to claim 1, wherein a ratio of a stator inner diameter to a coil volume outside the armature is between 1 mm/cm³ and 5 mm/cm³.

3. The synchronous electric motor according to claim 2, wherein a diameter of the wire forming each of the coils is between 0.13 mm and 1 mm.

4. The synchronous electric motor according to claim 2, wherein a width of the wire passage of each recess is between 1.5 mm and 2.5 mm.

5. The synchronous electric motor according to claim 2, wherein an inner diameter of the yoke is comprised between 25 mm and 58 mm.

6. The synchronous electric motor according to claim 1, wherein a diameter of the wire forming each of the coils is between 0.13 mm and 1 mm.

7. The synchronous electric motor according to claim 6, wherein an inner diameter of the yoke is comprised between 25 mm and 58 mm.

8. The synchronous electric motor according to claim 1, wherein a width of the wire passage of each recess is between 1.5 mm and 2.5 mm.

9. The synchronous electric motor according to claim 8, wherein a diameter of the wire forming each of the coils is between 0.13 mm and 1 mm, and
  wherein a minimum ratio of the width of the wire passage of each recess to the diameter of the wire forming each of the coils is equal to 1.5.

10. The synchronous electric motor according to claim 8, wherein an inner diameter of the yoke is comprised between 25 mm and 58 mm.

11. The synchronous electric motor according to claim 1, wherein the armature comprises a number of teeth equal to twelve and a number of recesses equal to twelve.

12. The synchronous electric motor according to claim 1, wherein an inner diameter of the yoke is comprised between 25 mm and 58 mm.

13. A set of electric motors configured to selectively operate with a closure, occultation or solar protection device, the set comprising:
  the synchronous electric motor according to claim 1 configured to operate with the closure, occultation or solar protection device; and
  an asynchronous electric motor configured to operate with the closure, occultation or solar protection device, the asynchronous electric motor comprising:
    a rotor, and
    a stator comprising
      an armature comprising:
        a yoke, and
        teeth defining recesses, and
      coils mounted in the recesses of the armature of the asynchronous electric motor,
  wherein a ratio of a surface area of each recess of the asynchronous electric motor to a thickness of the yoke is between 5 mm and 10 mm, the surface area of each recess of the asynchronous electric motor being measured in a plane perpendicular to a central axis of the stator of the asynchronous electric motor,
  wherein the armature of the stator of the synchronous electric motor and the armature of the stator of the asynchronous electric motor are identical, wherein the stator of the synchronous electric motor and the stator of the asynchronous electric motor are respectively wound by insertion, each coil of the respective electric motors being formed from a wire outside the respective stator, to insert the coils subsequently into the recesses, through wire passages of the recesses, according to a direction radial to the central axis of the stator,
wherein a height of the armature of the asynchronous electric motor is between 20 mm and 120 mm, and
wherein an outer diameter of the yoke of the asynchronous electric motor is comprised between 30 mm and 65 mm.

14. The set of electric motors according to claim 13, wherein a diameter of the wire forming each of the coils is between 0.13 mm and 1 mm.

15. The set of electric motors according to claim 13, wherein a width of the wire passage of each recess is between 1.5 mm and 2.5 mm.

16. The set of electric motors according to claim 13, wherein respective winding patterns of each of the synchronous and asynchronous electric motors are configured based on a type of the respective electric motors and according to a supply voltage of the respective electric motors.

17. A closure, occultation or solar protection device comprising:
  a screen; and
  an electromechanical actuator, the screen being driven to move by the electromechanical actuator, the electromechanical actuator comprising:
    at least one of the synchronous electric motor and the asynchronous electric motor selected from the set of electric motors according to claim 13.

18. The closure, occultation or solar protection device according to claim 17, further comprises a winding tube, the screen being configured to be wound onto the winding tube, the winding tube being configured to be rotated by the electromechanical actuator.

19. The closure, occultation or solar protection device according to claim 18, wherein an inner diameter of the winding tube is between 40 mm and 100 mm.

20. A method for manufacturing one of the synchronous electric motor and the asynchronous electric motor of the set of electric motors according to claim 13, the method comprising:
  selecting the one electric motor of the synchronous electric motor and the asynchronous electric motor from the set of electric motors;
  selecting a winding pattern of the stator of the selected electric motor based on a type of the selected electric motor; and
  winding the winding pattern of the stator of the selected electric motor by insertion, each of the coils of the selected electric motor being formed from a wire outside the stator of the selected electric motor, so that the coils are subsequently inserted into the recesses of the selected electric motor, through wire passages of the recesses of the selected electric motor, according to a direction radial to the central axis of the stator of the selected electric motor.

* * * * *